US010253821B2

(12) United States Patent
Knuth

(10) Patent No.: US 10,253,821 B2
(45) Date of Patent: Apr. 9, 2019

(54) SELF-ALIGNING DRIVESHAFT COUPLER

(71) Applicant: Deere & Company, Moline, IL (US)

(72) Inventor: Thomas M. Knuth, Thomson, GA (US)

(73) Assignee: DEERE & COMPANY, Moline, IL (US)

( * ) Notice: Subject to any disclaimer, the term of this patent is extended or adjusted under 35 U.S.C. 154(b) by 277 days.

(21) Appl. No.: 14/620,953

(22) Filed: Feb. 12, 2015

(65) Prior Publication Data

US 2016/0238081 A1 Aug. 18, 2016

(51) Int. Cl.
*F16D 3/38* (2006.01)
*B60K 17/28* (2006.01)
*F16D 1/108* (2006.01)
*A01B 71/06* (2006.01)

(52) U.S. Cl.
CPC .............. *F16D 3/387* (2013.01); *B60K 17/28* (2013.01); *F16D 1/108* (2013.01); *A01B 71/06* (2013.01); *B60Y 2200/221* (2013.01); *Y10S 464/901* (2013.01); *Y10S 464/905* (2013.01)

(58) Field of Classification Search
CPC ......... Y10T 403/32581; Y10T 403/598; Y10T 403/7005; Y10T 403/7079; Y10T 403/7088; Y10T 403/7007; Y10S 464/901; Y10S 464/905; A01D 69/08; F16D 3/34; F16D 3/387; F16D 7/042; F16D 7/044; F16D 7/046; F16B 21/02; F16B 21/04; F16B 21/09
USPC ...... 403/116, 324, 348, 379.5; 464/901, 905
See application file for complete search history.

(56) References Cited

U.S. PATENT DOCUMENTS

| 3,000,673 | A | * | 9/1961 | Lansing | .............. | B60B 35/1027 |
| | | | | | | 180/340 |
| 3,260,541 | A | | 7/1966 | Sandler et al. | | |
| 3,357,206 | A | | 12/1967 | Christie | | |
| 3,551,013 | A | * | 12/1970 | Trojanowski | .......... | F16D 1/116 |
| | | | | | | 285/316 |
| 3,747,966 | A | | 7/1973 | Wilkes et al. | | |

(Continued)

FOREIGN PATENT DOCUMENTS

| CH | 700130 A1 * | 7/2010 | ............. F16D 7/046 |
| DE | 19831273 A1 | 1/2000 | |

(Continued)

OTHER PUBLICATIONS

European Search Report in counterpart application No. EP15190156.8 dated Jun. 28, 2016 (5 pages).

(Continued)

*Primary Examiner* — Josh Skroupa
*Assistant Examiner* — Cory B Siegert

(57) ABSTRACT

A self-aligning driveshaft coupler includes a receiving clutch having a spiral channel around its neck, and a locking clutch assembly with a first ring shaped member and a second ring shaped member that rotate together. A locking pin extends radially from the second ring shaped member and into the spiral channel and pulls the locking clutch assembly toward the receiving clutch as the receiving clutch rotates. A plurality of drive pins extend axially from the first ring shaped member and engage the receiving clutch when the locking pin is at the end of the spiral channel.

18 Claims, 5 Drawing Sheets

(56) References Cited

U.S. PATENT DOCUMENTS

| | | | |
|---|---|---|---|
| 4,262,501 A * | 4/1981 | Vaughn | F16D 7/08 464/36 |
| 4,283,158 A * | 8/1981 | Takahata | F16D 1/116 403/322 |
| 4,289,414 A | 9/1981 | Recker | |
| 4,402,626 A | 9/1983 | Recker | |
| 4,462,345 A * | 7/1984 | Routery | F01B 3/04 123/197.4 |
| 4,492,292 A | 1/1985 | Thor | |
| 4,540,305 A | 9/1985 | Geisthoff | |
| 4,553,652 A * | 11/1985 | Fallos | F16D 7/046 192/18 R |
| 4,900,181 A | 2/1990 | Geisthoff | |
| 4,934,471 A | 6/1990 | Tanaka et al. | |
| 4,960,344 A | 10/1990 | Geisthoff et al. | |
| 5,303,790 A | 4/1994 | Coleman | |
| 5,522,669 A | 6/1996 | Recker | |
| 5,658,087 A | 8/1997 | Butkovich et al. | |
| 5,667,330 A | 9/1997 | Henkel et al. | |
| 6,514,003 B2 * | 2/2003 | Horikawa | B30B 15/10 403/359.1 |
| 6,863,465 B2 * | 3/2005 | Brancheriau | B62D 25/147 403/13 |
| 7,462,105 B2 * | 12/2008 | Lattin | F16D 3/70 464/137 |
| 7,517,179 B2 * | 4/2009 | Miller | B23B 31/06 192/93 C |
| 7,641,415 B2 | 1/2010 | Fox et al. | |
| 7,997,362 B2 | 8/2011 | Herchenbach et al. | |
| 8,364,363 B2 | 1/2013 | Nakamura et al. | |
| 2007/0246270 A1 * | 10/2007 | Priepke | B60K 17/28 180/53.1 |
| 2013/0336719 A1 * | 12/2013 | Baus | F16B 2/16 403/379.5 |
| 2013/0341149 A1 * | 12/2013 | Rupp | A47L 11/202 192/56.62 |
| 2014/0246839 A1 * | 9/2014 | Hebenstreit | B62D 7/06 280/124.125 |
| 2014/0353994 A1 * | 12/2014 | Seshachalam | F16B 21/06 294/119.1 |
| 2015/0024882 A1 * | 1/2015 | Ochab | F16H 55/56 474/19 |

FOREIGN PATENT DOCUMENTS

| | | |
|---|---|---|
| EP | 1967060 A1 | 10/2008 |
| EP | 1985168 A1 | 10/2008 |
| EP | 2564680 A1 | 3/2013 |

OTHER PUBLICATIONS

"Power Lock, Coupling the PTO shaft comfortably from the driver's seat." Pöttinger Agricultural Technology [online article]. Retrieved on Feb. 12, 2015. Retrieved from the Internet: <http://www.poettinger.at/en_UK/Newsroom/Artikel/1582>.

* cited by examiner

SELF-ALIGNING DRIVESHAFT COUPLER

FIELD OF THE INVENTION

This invention relates generally to coupler devices between tractor power take offs and agricultural implements, and specifically to quick connect couplers for coupling power take offs to driveshafts of rear mounted implements.

BACKGROUND OF THE INVENTION

Tractors may be equipped with a power take off (PTO) that transmits rotary power from an engine to an implement. The most common location for the PTO shaft is at the rear of the tractor, but some tractors have auxiliary PTO shafts at other locations. The direction of rotation, rotational speed, approximate location and exact dimensions of the PTO shaft are standardized to provide ability to interchange between power shafts on various implements made by different manufacturers. PTO shafts typically rotate at 540 rpm, 1000 rpm, 2100 rpm, or more than one speed.

To engage the PTO to the shaft or drive line of a rear mounted implement, the PTO may have the ability to telescope. After the tractor is in proper position, the tractor operator may manually extend the telescoping PTO and employ various coupler devices to couple the PTO to the implement power shaft. This requires getting down off the seat or operator station of the tractor, and it can be quite time consuming to couple the power take off to the implement manually. Coupling a tractor PTO to the driveline of an implement also can be difficult and dirty.

In the past, PTOs have been coupled to implement drivelines using splines to transmit rotational power, along with an additional keeper to secure the coupled parts and resist thrust loads. Often it is difficult to find the correct alignment for the female spline of the drive line and the male spline of the tractor PTO. Sometimes it is necessary for the operator to turn the implement drive line until the correct alignment is found.

After correct alignment is accomplished, the operator still must hold back a driveline locking feature until the implement shaft or driveline is in place. It may be difficult to manipulate the lock back feature or turn the implement driveline to obtain correct alignment between the PTO and the implement shaft.

A need exists for an improved apparatus and method for coupling a PTO on a tractor to the shaft or driveline of an implement. There is a need for greater operator safety and ease of use when hooking up a tractor PTO to the shaft of an implement. There is a need for a self-aligning driveshaft coupler that may be used with standard PTO driveshafts on tractors, and with standard shafts or drivelines on a variety of different implements. There also is a need for a self-aligning driveshaft coupler that does not require any external energy source such as electricity, hydraulics or pneumatics.

SUMMARY OF THE INVENTION

A self-aligning driveshaft coupler includes a receiving clutch having a neck with a spiral channel, and a base with a plurality of receiving holes. A locking clutch assembly has an inwardly extending locking pin that enters and follows the spiral channel and pulls the locking clutch assembly axially toward the base as the receiving clutch rotates, and a plurality of drive pins that enter the receiving holes to rotatably engage the locking clutch assembly to the receiving clutch.

The self-aligning driveshaft coupler provides greater operator safety and ease of use when hooking up a tractor PTO to the shaft of an implement. It may be used with standard PTO driveshafts on tractors, and with standard shafts or drivelines on a variety of different implements. The self-aligning driveshaft coupler also does not require any external energy source such as electricity, hydraulics or pneumatics

DESCRIPTION OF THE PREFERRED EMBODIMENT

Figure 1:
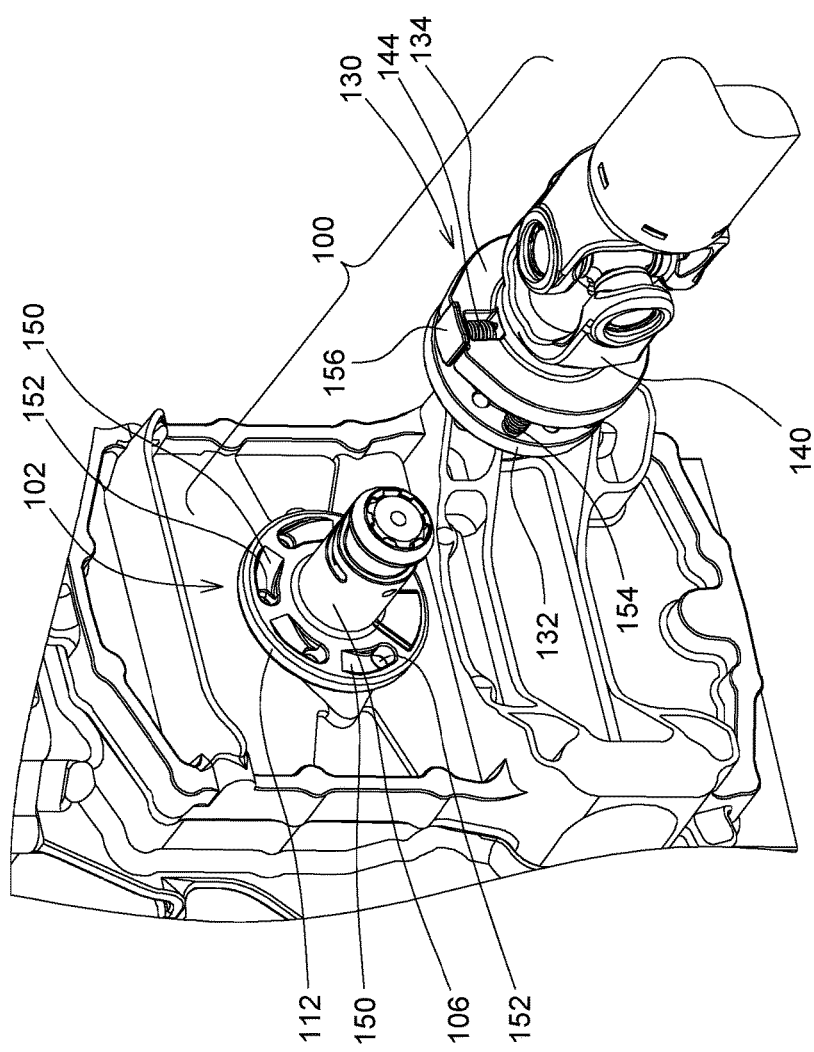
FIG. 1 is a perspective view of a small and/or compact tractor with a self-aligning driveshaft coupler according to one embodiment of the invention.
Figure 2:
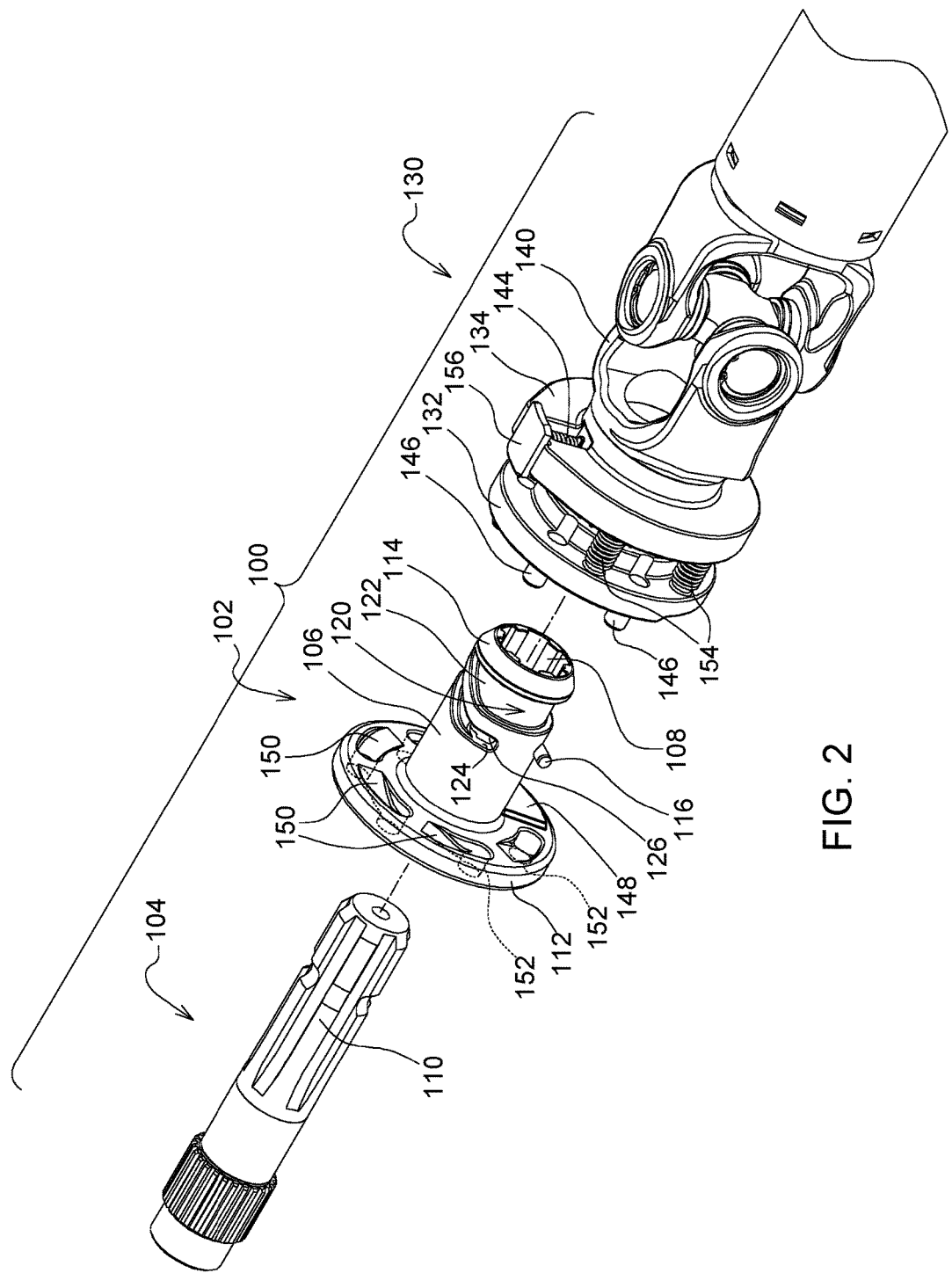
FIG. 2 is a perspective view of a self-aligning driveshaft coupler before connection according to one embodiment of the invention.

As shown in FIGS. 1-5, self-aligning driveshaft coupler 100 may be used to connect a tractor PTO to a driveline or shaft of a rear mounted implement. The self-aligning driveshaft coupler may include receiving clutch 102 installed and mounted to tractor PTO output shaft 104. The receiving clutch may include neck 106 with internal splines 108 that fit around and engage the external splines 110 on a standard tractor PTO output shaft. The neck may be integral with base or flange 112. The outer end 114 of the neck may have a sloped lip that does not extend beyond the end of the tractor PTO output shaft. The receiving clutch may be secured to the tractor PTO output shaft using pin 116 inserted through radial hole 118 in the neck and a corresponding hole in the tractor PTO output shaft. Other similar devices may be used to secure the receiving clutch axially to the tractor PTO output shaft.

In one embodiment, the self-aligning driveshaft coupler may include a spiral channel 120 extending up to or about 360 degrees around the outer circumferential surface of neck 106. The spiral channel may have a wide first end 122 near the outer end 114 of the neck, and may spiral around the neck's outer circumference toward base or flange 112. The spiral channel may taper down to a narrower second end 124, and may terminate between the outer end 114 and base or flange 112. At or near the second end of the spiral channel, a radial slot 126 may be dimensioned to receive locking pin 128.

In one embodiment, the self-aligning driveshaft coupler may include locking clutch assembly 130 on an implement, including a first ring shaped member 132 and a second ring shaped member 134. The first and second ring shaped members may be slidably engaged together with internal splines or teeth 136 and external splines or teeth 138 for rotation together, and also may be retained axially together by retainer ring 158. The second ring shaped member may be secured to the implement driveline, shown here as welded together or cast to form an integral part along with universal joint 140.

Figure 3:
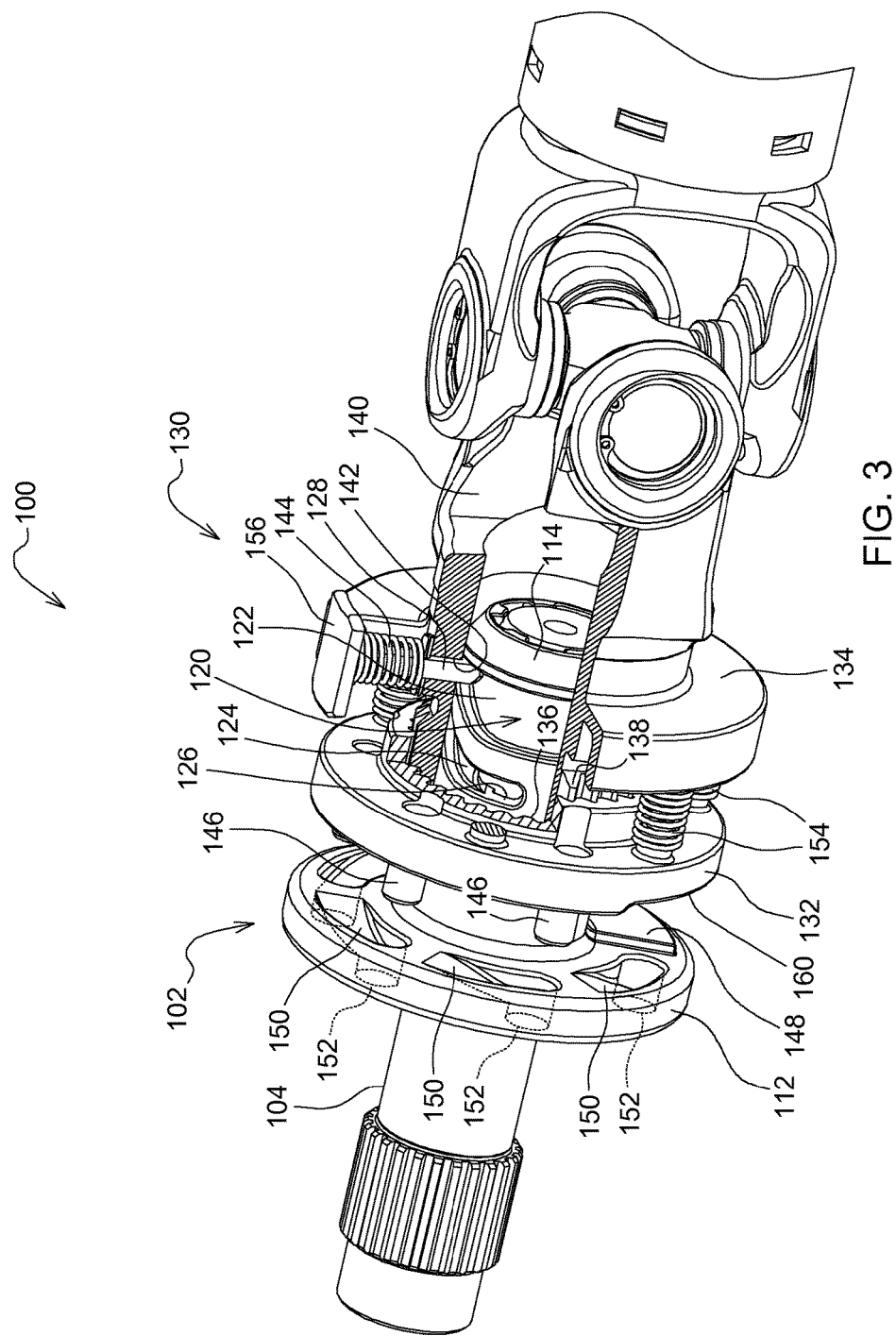
FIG. 3 is a perspective view, partially in section, of a self-aligning driveshaft coupler during initial connection, according to one embodiment of the invention.

In one embodiment, the self-aligning driveshaft coupler may include locking pin 128 slidably mounted in radial hole 142 in the second ring shaped member 134. The operator may start connecting the self-aligning driveshaft coupler by picking up the locking clutch assembly 130 and sliding it axially onto receiving clutch 102. The operator may move the locking clutch assembly far enough to slide locking pin 128 over the sloped lip at the outer end 114 of neck 106 and into the first wide end 122 of spiral channel 120, as shown in FIG. 3. Or the operator may retract locking pin 128 using release button or lever 156, until the locking pin reaches spiral channel 120. Spring 144 may be mounted around the locking pin and may urge the locking pin radially into the first wide end of the channel. The operator then may operate the tractor to rotate PTO output shaft 104. As the PTO output shaft rotates up to about 360 degrees or one complete revolution, spiral channel 120 pulls locking pin 128, and locking assembly 130, further onto receiving clutch 102.

Figure 4:
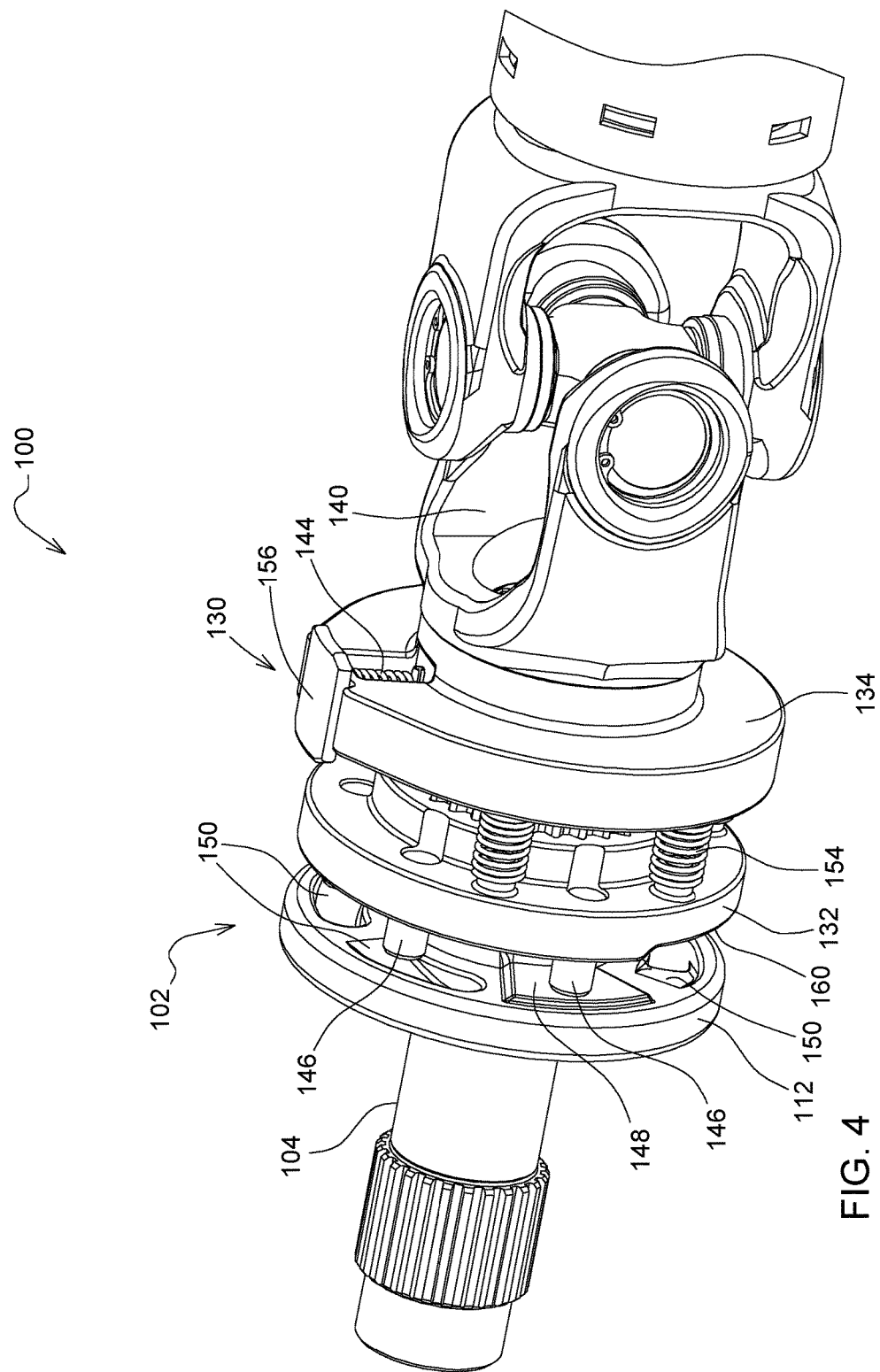
FIG. 4 is a perspective view of a self-aligning driveshaft coupler during later connection, according to one embodiment of the invention.

In one embodiment, the self-aligning driveshaft coupler may include a plurality of drive pins 146 that project axially from first ring shaped member 132 toward receiving clutch 102. For example, the first ring shaped member may have five drive pins. As shown in FIG. 3, while locking pin 128 is in the first wide end of the spiral channel, the drive pins may be spaced from the base or flange 112 of the receiving clutch. As the tractor PTO output shaft rotates, the channel pulls the locking pin and the locking clutch assembly further onto the receiving clutch. The first and second ring shaped members advance axially toward the receiving clutch. For part of a rotation (for example, about 60 degrees), the first ring shaped member may stop advancing axially until drive pins 146 reach and contact base or flange 112. Optionally, as shown in FIG. 4, one of drive pins 146 may contact a raised portion 148 on the base or flange, while the other drive pins may remain spaced from the base or flange.

Figure 5:
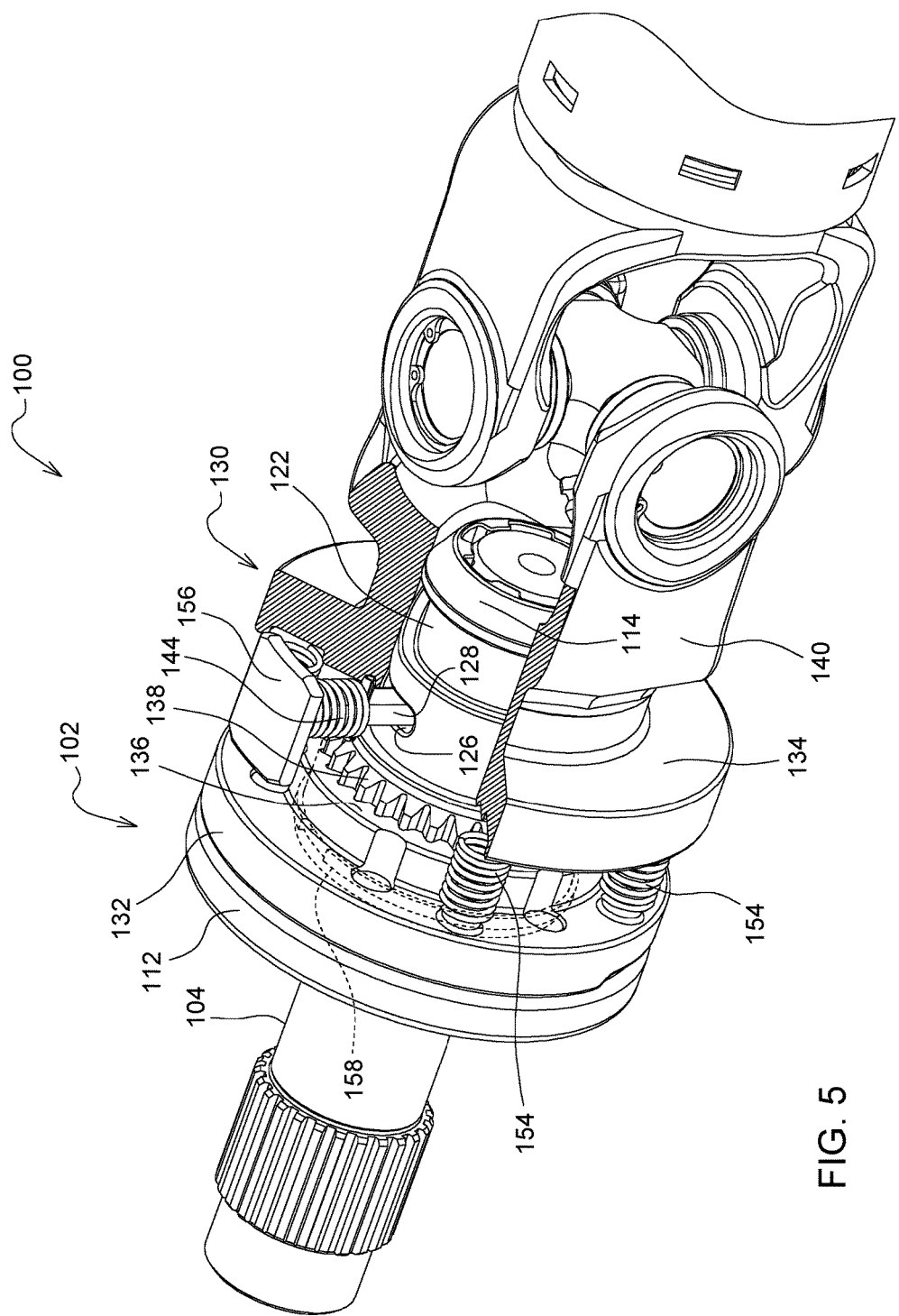
FIG. 5 is a perspective view, partially in section, of a self-aligning driveshaft coupler after connection according to one embodiment of the invention.

In one embodiment, the self-aligning driveshaft coupler may include a plurality of ramps 150 with a receiving hole 152 at the bottom end of each ramp. As the tractor PTO output shaft continues rotating the first ring shaped member again advances axially so that all of the drive pins 146 may contact the base or flange 112 adjacent the start of each ramp 150. Each ramp may be less than about 60 degrees around the base or flange. Springs 154 may be positioned between the first ring shaped member and the second ring shaped member. As shown in FIG. 5, the springs may urge the first ring shaped member axially toward the receiving member, and drive pins 146 down the ramps into receiving holes 152. Optionally, the first ring shaped member may have a mating surface 160 where raised portion 148 may fit.

In one embodiment, the self-aligning driveshaft coupler may include locking pin 128 that may enter radial slot 126 at or nearly the same time as drive pins 146 enter receiving holes 152. Spring 144 may urge the locking pin into radial slot 126. To disconnect the self-aligning driveshaft coupler, the operator may use driveshaft release button 156, or a release lever, to pull the locking pin out from the radial slot. Once the locking pin is released, the locking clutch assembly may slide axially off the receiving clutch.

Having described a preferred embodiment, it will become apparent that various modifications can be made without departing from the scope of the invention as defined in the accompanying claims. For example, the self-aligning driveshaft coupler may be used on mid-mount or front-mount PTOs or other agricultural equipment.

The invention claimed is:

1. A self-aligning driveshaft coupler, comprising:
   a receiving clutch on a tractor PTO output shaft that is rotatable and has a neck with a spiral channel around the outer circumference of the neck; the spiral channel having a first end and a second end;
   a locking clutch assembly on an implement shaft with a first ring shaped member and a second ring shaped member that are splined together;
   a locking pin extending radially from the second ring shaped member and into the first end of the spiral channel and pulling the locking clutch assembly axially toward the receiving clutch as the receiving clutch rotates until the locking pin is in the second end of the spiral channel; and
   a plurality of drive pins extending axially from the first ring shaped member, the plurality of drive pins being spaced from the receiving clutch when the locking pin is in the first end of the spiral channel and engaging the receiving clutch when the receiving clutch rotates until the locking pin is in the second end of the spiral channel and the plurality of drive pins are in a plurality of receiving holes to prevent further rotation of the receiving clutch relative to the locking clutch assembly.

2. The self-aligning driveshaft coupler of claim 1 further comprising a base on the receiving clutch having a plurality of ramps contacted by the drive pins during rotation of the receiving clutch until each drive pin enters one of the plurality of receiving holes at the bottom of each ramp.

3. The self-aligning driveshaft coupler of claim 1 further comprising a spring urging the locking pin into the spiral channel.

4. The self-aligning driveshaft coupler of claim 3 further comprising a release button connected to the locking pin to pull the locking pin out of the spiral channel.

5. The self-aligning driveshaft coupler of claim 1 further comprising a slot at the second end of the spiral channel dimensioned for holding the locking pin in place.

6. The self-aligning driveshaft coupler of claim 1 wherein the first end of the spiral channel is wider than the second end of the spiral channel.

7. A self-aligning driveshaft coupler, comprising:
   a receiving clutch on a tractor PTO output shaft having a neck with an outer circumferential surface with a spiral channel, and a base with a plurality of receiving holes; and
   a locking clutch assembly on an implement yoke having a splined connection between a first ring shaped member and a second ring shaped member, a plurality of drive pins on the first ring shaped member and an inwardly and radially extending locking pin on the second ring shaped member that enters and follows the spiral channel and pulls the locking clutch assembly and the plurality of drive pins axially toward the base as the receiving clutch rotates until the plurality of drive pins contact the base before entering the receiving holes to stop further rotation of the receiving clutch relative to the locking clutch assembly.

8. The self-aligning driveshaft coupler of claim 7 further comprising at least one spring on the locking clutch assembly that urge the drive pins into the receiving holes.

9. The self-aligning driveshaft coupler of claim 7 further comprising a plurality of ramps from the base into each of the receiving holes.

10. A self-aligning driveshaft coupler, comprising:
a receiving clutch on a tractor PTO output shaft having a neck with an outer circumferential surface with a spiral channel, and a base with a plurality of receiving holes; and
a locking clutch assembly on an implement yoke having a first ring shaped member and a second ring shaped member splined to the first ring shaped member, a plurality of drive pins, and an inwardly and radially extending locking pin that enters and follows the spiral channel and pulls the locking clutch assembly and the plurality of drive pins axially toward the base as the receiving clutch rotates until the plurality of drive pins enter the receiving holes to stop further rotation of the receiving clutch relative to the locking clutch assembly.

11. The self-aligning driveshaft coupler of claim 10 further comprising a slot in the spiral channel that engages the locking pin when the drive pins enter the receiving holes.

12. The self-aligning driveshaft coupler of claim 10 further comprising a raised surface on the base that is contacted by one of the drive pins during rotation of the receiving clutch before the drive pins reach the receiving holes.

13. A self-aligning driveshaft coupler, comprising:
a locking clutch assembly on an implement yoke and having a splined connection between a first ring-shaped member and a second ring-shaped member;
a receiving clutch on a PTO output shaft;
a locking pin on the second ring-shaped member of the locking clutch assembly;
a spiral channel on the outer circumference of the receiving clutch that guides the locking pin and pulls the locking clutch assembly axially onto the receiving clutch during rotation of the receiving clutch; and
a plurality of axially extending drive pins on the first ring-shaped member of the locking clutch assembly that contact the receiving clutch as the receiving clutch rotates and enter a plurality of receiving holes to stop further rotation of the receiving clutch relative to the locking clutch assembly.

14. The self-aligning driveshaft coupler of claim 13 wherein the locking pin is spring biased into the spiral channel.

15. The self-aligning driveshaft coupler of claim 13 wherein the axially extending drive pins are spring biased into the receiving holes.

16. The self-aligning driveshaft coupler of claim 13 wherein the spiral channel has a wide first end and a narrower second end.

17. A self-aligning driveshaft coupler, comprising:
a locking clutch assembly on an implement yoke and a receiving clutch on a PTO output shaft;
a first ring shaped member and a second ring shaped member engaged together by splines on the locking clutch assembly;
a locking pin on the locking clutch assembly;
a spiral channel on the outer circumference of the receiving clutch that guides the locking pin and pulls the locking clutch assembly axially onto the receiving clutch during rotation of the receiving clutch; and
a plurality of axially extending drive pins on the locking clutch assembly that are pulled toward a plurality of receiving holes in the receiving clutch, and enter the plurality of receiving holes to stop further rotation of the receiving clutch relative to the locking clutch assembly.

18. The self-aligning driveshaft coupler of claim 17 wherein each of the receiving holes is at the bottom of a ramp.

* * * * *